May 4, 1948.                R. D. ACTON                2,440,765
                    TRACTOR-MOUNTED POWER LOADER
                Filed Dec. 29, 1945            2 Sheets-Sheet 2
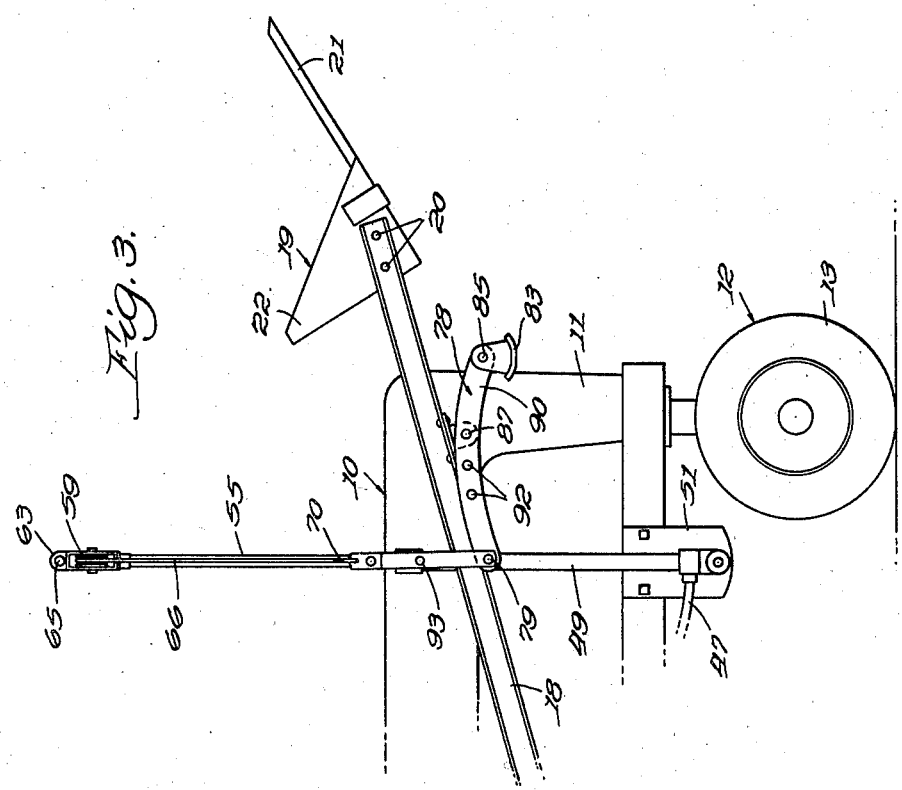
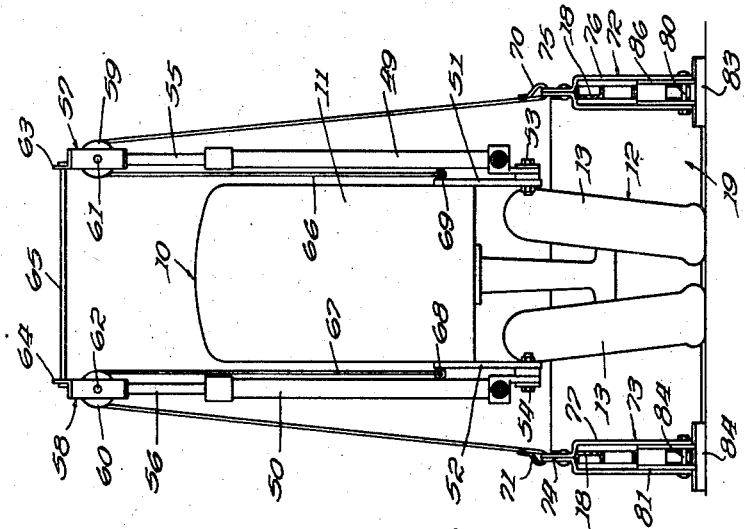
Inventor:
Russel D. Acton.
By Paul O. Pippel
Atty.

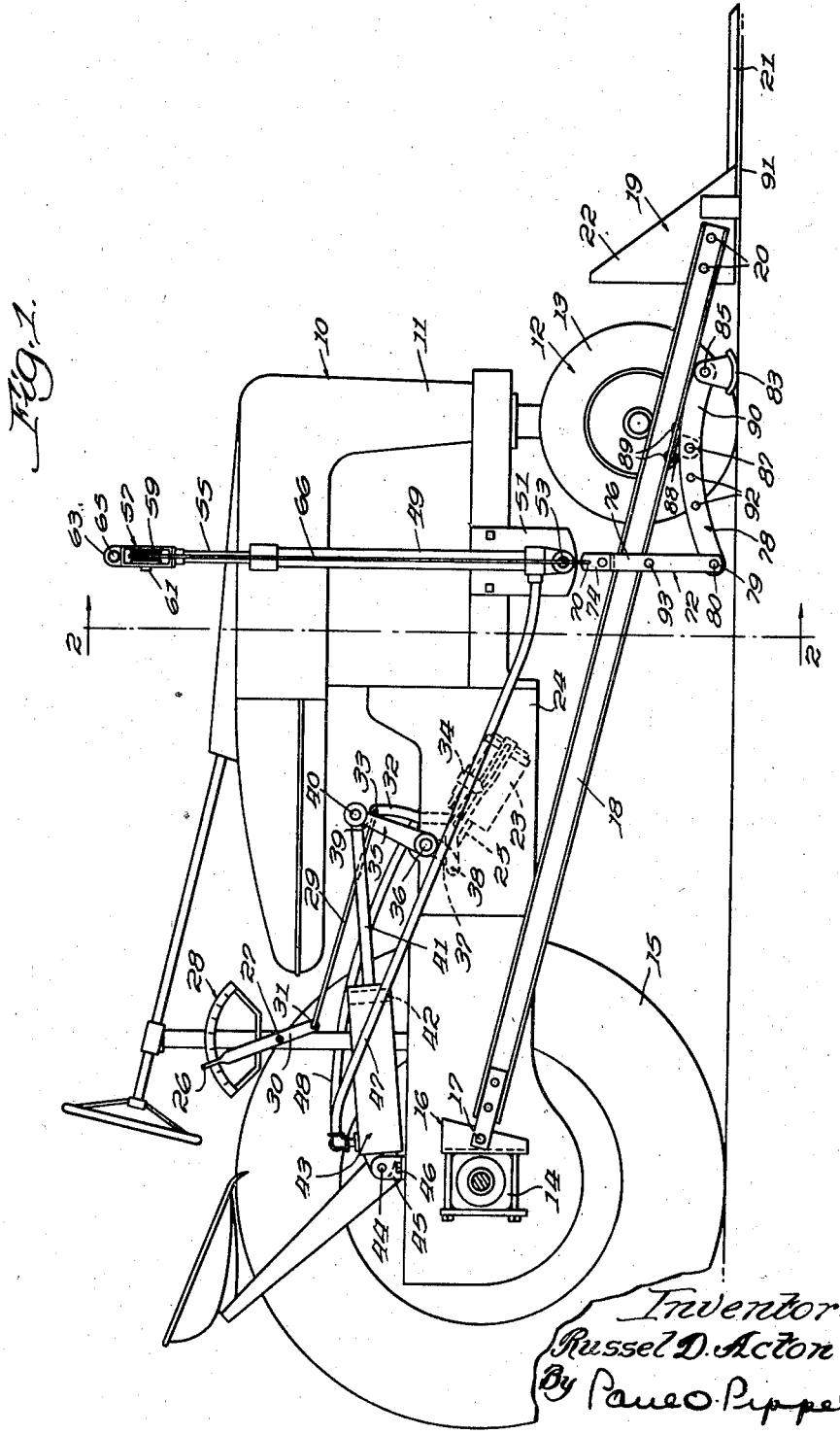

Patented May 4, 1948

2,440,765

UNITED STATES PATENT OFFICE 2,440,765

TRACTOR-MOUNTED POWER LOADER

Russel D. Acton, Chicago, Ill.

Application December 29, 1945, Serial No. 638,263

2 Claims. (Cl. 214—140)

This invention relates to a new and improved tractor-mounted power loader and has for one of its principal objects the provision of means for initially lifting the loader with an increased leverage.

Another object of this invention is to provide a tractor-mounted loader liftable by cables and so arranged as to pry the loader from its ground-engaging position prior to complete suspension by the cables.

A further important object of this invention is to provide a tractor-mounted power loader arranged to preliminarily lift on a ground-engaging foot prior to the tractor assuming the complete load.

A still further important object of this invention is the provision of adjustable advantage means for initially raising the shovel portion of a tractor-mounted power loader and subsequently to raise the entire mechanism with the loader shovel.

Other and further important objects of the invention will become apparent from the disclosures in the following specification and accompanying drawings, in which:

Figure 1 is a side elevational view of the tractor-mounted loader of this invention.

Figure 2 is a sectional view of the loader taken on the line 2—2 of Figure 1.

Figure 3 is a partial side elevational view of the tractor-mounted loader as shown in Figure 1 with the shovel in raised position.

Tractor-mounted loaders are generally equipped with a shovel extending forwardly of the tractor and a pair of beams pivotally attached at some point near the rear of the tractor. Some power means is customarily arranged to lift and lower the shovel and its rearwardly extending beams. Uses of power loaders are numerous. One of the main uses of a loader is to clean a cattle yard. The manure and other material deposited in such a yard become heavy and dense making removal very difficult. Use of an ordinary loader in such material puts excessive strain on the tractor inasmuch as the weight per unit volume is so great that the regular size shovel for such loaders carries much too great a load for the tractor. The weight of the material is not the main nor is it the sole problem of the loader. The material's adherence and interrelation with adjacent material makes the tearing loose of a shovel load almost impossible without additional power means. Hence breaking a load loose is the primary function of the loader. In addition to obtaining sufficient power to raise the loader shovel it is essential that the initial "breaking loose" load of the shovel be assumed by something other than the tractor which lifts the loader. Loaders of this general type are usually applied to tricycle-type tractors, and the small front steerable wheels are incapable of taking the "breaking loose" loads without seriously damaging the tires or the structural supports for these wheels.

As shown in the drawings:

The reference numeral 10 indicates generally an agricultural tractor of the tricycle type having a longitudinally extending narrow body portion 11 having a front steerable rolling support 12 and as shown equipped with pneumatic tires 13. The rearward end of the tractor is relatively wide having an axle housing 14 extending transversely across the end of the narrow body portion 11 and carrying large traction wheels 15 at the ends thereof.

A bracket structure 16 is clamped to the axle housing 14 as shown in Figure 1 and forms a pivotal support at 17 for forwardly extending channel beams 18 on each side of the body portion 11 of the tractor 10. The beams 18 need not be channel in shape but rather are made that way only to insure sufficient strength for the power loader. A loading shovel 19 is mounted on the forward ends of the beams 18 at 20. The shovel 19 is equipped with forwardly extending tines or fingers 21 capable of penetration into material to be lifted. A heel portion 22 forms an enclosure for the rear of the shovel 19 and prevents material from falling off.

The tractor 10 is equipped with a hydraulically operated cylinder 23 built into the chassis portion 24 of the body 11. Control of a piston rod 25 is actuated by admission or withdrawal of fluid under pressure to the cylinder 23. The amount of movement may be controlled by a hand lever 26 pivoted at 27 within a quadrant 28. The quadrant 28 is equipped with a calibrated scale adapted to indicate the amount of movement of the piston rod 25. A connecting link 29 joins a lower extension 30 of the hand lever 26 at 31. The forward end of the link 29 joins a lever 32 at 33 and directly shifts a stop member 34 which regulates the amount of maximum movement of the piston 25. A lever arm 35 is pivoted at 36 on the tractor chassis 24 and has its lower extension 37 joining with the piston 25 at 38. An upper extension 39 of the lever arm 35 is pivotally attached at 40 to a piston rod 41 having a piston 42 at the other end thereof slidably movable within a hydraulic cylinder 43. The cylinder 43 is pivotally attached at 44 to a lug member 45 bolted to the chassis 24 at 46. Movement of the lever 35 about its pivotal attachment 36 forces the piston 42 inwardly and outwardly within the cylinder 43. Such movement about the pivot 36 causes upward and downward movement of the cylinder 43, and hence the pivotal attachment of the cylinder 43 at 44 is quite necessary. The cylinder 43 contains a fluid which is adapted to be forced downwardly through flexible conduits 47 and 48 to cylinders 49 and 50, respectively.

Each of the cylinders 49 and 50 is attached to a depending bracket 51 and 52, respectively. The lower end of each cylinder 49 and 50 is bolted to the brackets 51 and 52 by bolt members 53 and 54. Each of the cylinders 49 and 50 has an upwardly extending piston rod 55 and 56. The upper portion of each piston rod 55 and 56 carries a short bracket member 57 and 58 forming a rotatable support for pulley members 59 and 60. The pulley member 59 is pivoted at 61 on the bracket 57 and the pulley 60 is pivoted at 62 on the bracket 58. Ears 63 and 64 extend upwardly from the bracket members 57 and 58, respectively, and are joined by a tie rod 65. The tie rod 65 tends to maintain the piston rods 55 and 56 in equally extended position, and although it is not capable of resisting torsional stresses it aids considerably in the smooth lifting of the loader shovel. Cable members 66 and 67 are anchored at 68 and 69 to the sides of the tractor body 11. The cable members 66 and 67 extend upwardly around the pulleys 59 and 60, respectively, and then downwardly where they are fastened at 70 and 71, respectively, to bifurcated bracket members 72 and 73, respectively. Upper portions 74 and 75 of the bifurcated members 72 and 73 have apertures through which the cable members 66 and 67 are attached as shown at 70 and 71. Lower forked portions 76 and 77 extend down over both sides of the channel beams 18. As best shown in Figure 1 a lever arm 78 is pivoted at 79 by a pin member 80 to the lower end of the bifurcated bracket member 72. A similar lever arm 81 is pivoted by a pin member 82 to the lower end of the bifurcated bracket member 73 on the other side of the tractor. Ground engaging feet 83 and 84 are pivotally attached to the other end of the lever arms 78 and 81 at 85. Each of the lever arms 78 and 81 is pivotally attached intermediate its ends at 87 to a depending lug or ear 88 fastened to the under side of the channel beam by rivets or the like 89.

In operation the device is actuated by a movement of the hand lever 26 causing the cylinder 3 to actuate, which in turn causes movement of the piston 42 inwardly of the cylinder 43, thereupon causing fluid under pressure to be passed through the conduits 47 and 48 to the lower ends of the cylinders 49 and 50, respectively. As fluid is admitted to the cylinders 49 and 50, the piston rods 55 and 56 are forced upwardly thus causing a lifting action on the bifurcated members 72 and 73. Such a movement causes the lever arm 78 to pivot at 87, and the ground engaging feet 83 and 84 are swung downwardly so that a portion 90 of the lever arm 70 is in a vertical position between the pivotal attachment 87 and the foot member 83. When this occurs the loader shovel 19 has been raised free of the ground as indicated by the line 91. Up to this point the tractor has not assumed the full load of the material on the shovel 19 but rather all the load has been taken by the foot members 83 and 84. Continued extension of the piston rods 55 and 56 beyond the point where the pins 80 and 82 strike the lower sides of the channel beams 18 causes further upward movement of the shovel 19 as well as lifting movement of the foot pedals 83 and 84 and their associated lever arms. As best shown in Figure 3 the shovel 19 has been raised to its uppermost position, and it is apparent that the foot member 83 and the lever arm 78 lie closely adjacent the channel beam 18. As soon as the foot pedals 83 and 84 leave the ground, the load is transmitted to the tractor 10. However, after the load has been severed from the pile it ceases to be as heavy and hence is not liable to cause damage to the small front wheel support 12 of the tractor.

The lever arms 78 and 81 are equipped with a plurality of apertures 92 so that the mechanical advantage of the lever arm 78 may be varied as the need arises.

If it is desired to entirely eliminate the action of the initially pushed down foot, a pin or bolt may be inserted through apertures 93 in the bifurcated bracket members 72 and 73 immediately beneath the channel beams 18 so that upon initiating lifting action of the cables 66 and 67, the beams 18 will begin lifting instantly, thus lifting the shovel 18 and transmitting the shovel load directly to the tractor.

Numerous details of construction may be varied throughout a wide range without departing from the principles disclosed herein, and I therefore do not propose limiting the patent granted hereon otherwise than as necessitated by the appended claims.

What is claimed is:

1. A loading attachment for a tricycle tractor having a narrow body, a narrow front rolling support and spaced rear traction wheels comprising a frame including side frame members pivotally connected to the tractor adjacent the rear traction wheels and extending forwardly alongside the tractor body on opposite sides of the narrow front rolling support, a material holding structure mounted on said side frame members spaced forwardly of the tractor, lifting means connecting the tractor and the frame structure, power means operated by the tractor for actuating said lifting means, said means including generally horizontal lever arms pivotally attached to said side frame members, one end of said arms having ground engaging portions positioned adjacent the front rolling support, connecting means joining said power means to the other end of said arms, said means being constructed and arranged to initially move said ground engaging portions downwardly relative to the side frame members, whereby the force exerted during the initial lifting operation on the material holding structure is carried directly on the ground independent of the front rolling support of the tractor, said means being constructed and arranged to subsequently lift the side frame members with respect to the tractor by force then exerted directly on the tractor, the ground engaging portions being then lifted from the ground along with the side frame members.

2. A loading attachment for a tricycle tractor having a narrow body, a narrow front rolling support and spaced rear traction wheels comprising a frame including side frame members pivotally connected to the tractor adjacent the rear traction wheels and extending forwardly alongside the tractor body on opposite sides of the narrow front rolling support, a material holding structure mounted on said side frame members spaced forwardly of the tractor, lifting means connecting the tractor and the frame structure, power means operated by the tractor for actuating said lifting means, said lifting means including a cable, lever arms pivotally attached to said side frame members, one end of said arms having downwardly swingable shoes engageable with the ground adjacent the front rolling, said cable joining the power means and the other end of the arms whereby an upward movement of the power means causes the cable to pull the lever arms upwardly about their pivotal attachment in such a manner that the shoes swing downwardly relative to the side frame members whereby the force exerted during the initial lifting operation on the material holding structure is carried directly on the ground independent of the front rolling support of the tractor, said means being constructed and arranged to subsequently lift the side frame members with respect to the tractor by force then exerted directly on the tractor, the ground engaging portions being then lifted from the ground along with the side frame members.

RUSSEL D. ACTON.

REFERENCES CITED

The following references are of record in the file of this patent:

UNITED STATES PATENTS

| Number | Name | Date |
|---|---|---|
| 2,116,351 | Jones et al. | May 3, 1938 |
| 2,326,338 | Drott et al. | Aug. 10, 1943 |
| 2,393,299 | Denning | Jan. 22, 1946 |
| 2,403,808 | Laughead | July 9, 1946 |
| 2,417,560 | McNamara, Jr. | Mar. 18, 1947 |

FOREIGN PATENTS

| Number | Country | Date |
|---|---|---|
| 56,361 | Norway | Jan. 26, 1935 |